United States Patent [19]

Coker et al.

[11] Patent Number: 4,513,788

[45] Date of Patent: Apr. 30, 1985

[54] FLANGE SYSTEM FOR PIPELINE PLUGGING

[75] Inventors: Melvin D. Coker, Montebello, Calif.; John W. Wegner, Deer Park, Tex.

[73] Assignee: Koppl Company Inc., Montebello, Calif.

[21] Appl. No.: 555,371

[22] Filed: Nov. 28, 1983

[51] Int. Cl.³ ............................................. F16L 55/10
[52] U.S. Cl. .................. 138/89; 292/256.67; 403/362
[58] Field of Search .................. 138/89; 220/327, 328, 220/315; 403/362; 292/256.67, 155

[56] References Cited

U.S. PATENT DOCUMENTS

| | | | |
|---|---|---|---|
| 1,112,246 | 9/1914 | Adler | 292/155 |
| 2,085,119 | 6/1937 | Penick . | |
| 2,285,779 | 6/1942 | Mueller et al. . | |
| 2,425,483 | 8/1947 | Mueller et al. . | |
| 2,649,988 | 8/1953 | Campbell | 220/328 |
| 2,696,966 | 12/1954 | Mueller et al. . | |
| 2,744,654 | 5/1956 | Swerdlow | 220/327 |
| 2,771,096 | 11/1956 | Ver Nooy . | |
| 2,797,948 | 7/1957 | Tangard | 292/155 |
| 2,929,410 | 3/1960 | Morrison . | |
| 2,988,111 | 6/1961 | Ver Nooy . | |
| 3,025,885 | 3/1962 | Ver Nooy . | |
| 3,070,129 | 12/1962 | Poulallion et al. . | |
| 3,155,116 | 11/1964 | Ver Nooy . | |
| 3,157,203 | 11/1964 | Ver Nooy . | |
| 3,360,284 | 12/1967 | Ver Nooy . | |
| 3,463,195 | 8/1969 | Cooke | 138/94 |
| 3,534,941 | 10/1970 | Dunton | 251/360 |
| 3,785,041 | 1/1974 | Smith | 137/15 |
| 3,833,020 | 9/1974 | Smith | 138/94 |
| 3,867,964 | 2/1975 | Gardner | 138/89 |
| 3,991,791 | 11/1976 | Luckenbill | 138/94 |
| 4,019,541 | 4/1977 | Koppl | 138/89 |
| 4,299,255 | 11/1981 | Miller | 138/89 |
| 4,344,460 | 8/1982 | Galos | 138/89 |

FOREIGN PATENT DOCUMENTS 1147898 12/1957 France .

OTHER PUBLICATIONS

"Lock-O-Ring Flanges and Plugs", T.D.W. Bulletin 504.0, Mar. 1, 1981, T. D. Williamson Inc.
"TDW Lock-O-Ring Flanges and Plugs", 505.0, Nov. 15, 1975, T. D. Williamson Inc.
"Koppl Equipment for Tap-Ins or Line Stopping", Koppl Co.
"Instructions for Removal and Replacement of Segment Nuts in TDW D-79 Lock-O-Ring Flanges", T. D. Williamson Inc., Pub. No. 0037950079.
"Stopple Plugging Machines", TDW Bulletin 501.0, Mar. 1, 1981, T. D. Williamson Inc.
"Tapping and Stopple Fittings", TDW Bulletin 502.0, Mar. 1, 1981, T. D. Williamson Inc.

Primary Examiner—John W. Shepperd
Attorney, Agent, or Firm—Harris, Kern, Wallen & Tinsley

[57] ABSTRACT

A flange system for locking a plug in a pipeline flange. The flange system includes a flange with an axial passage for receiving a pipeline plug with a first annular groove. At least one radial passage for receiving a locking means and at least one locking means for engaging the first annular groove for locking the plug in place within the flange. Each such locking means is carried in a radial passage in the flange, the radial passage including a threaded driver bore and an unthreaded pin bore. Each such locking means includes a driver threadedly carried in the driver bore and a pin attached to the driver and carried in the pin bore. The locking means may include an arcuate locking collar carried by the pin, such that rotation of the driver causes the locking collar to be inserted into or retracted from the first annular groove of the plug, for locking and unlocking the plug in the flange.

9 Claims, 7 Drawing Figures

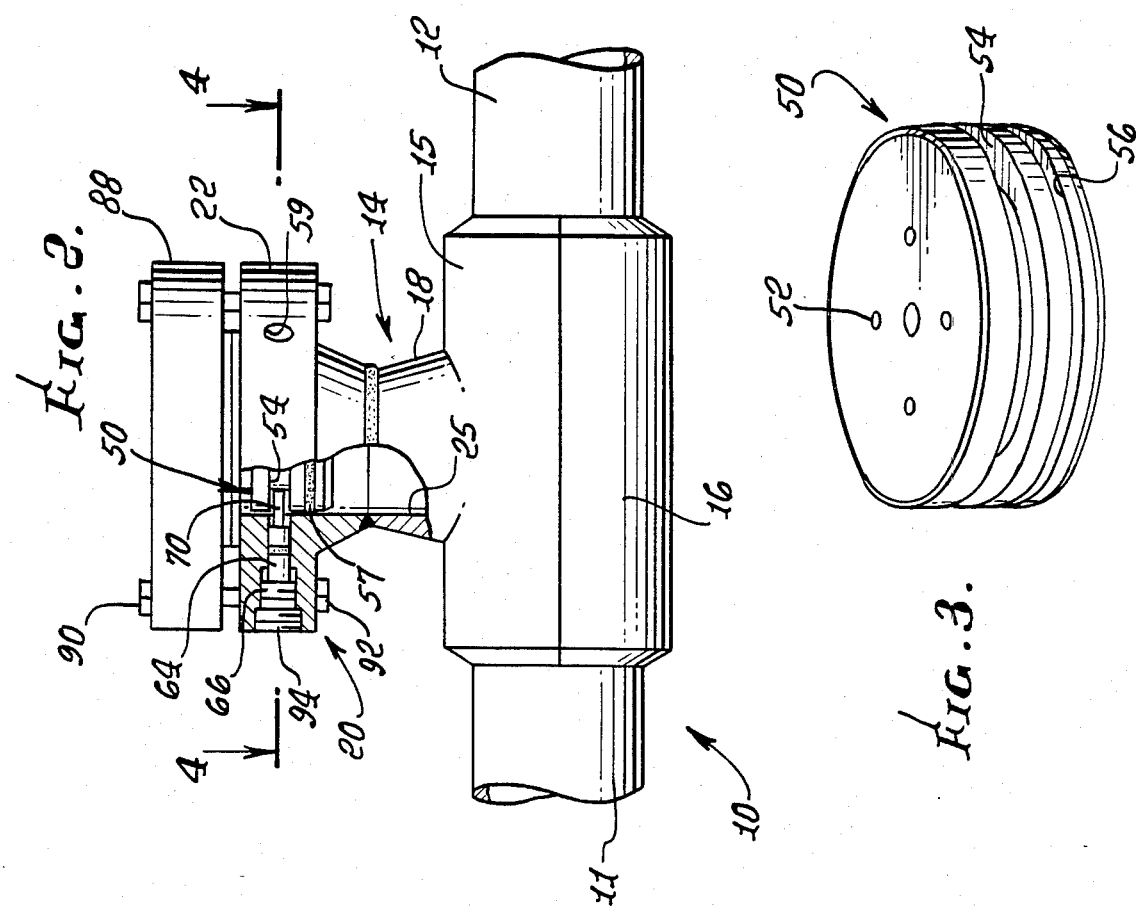
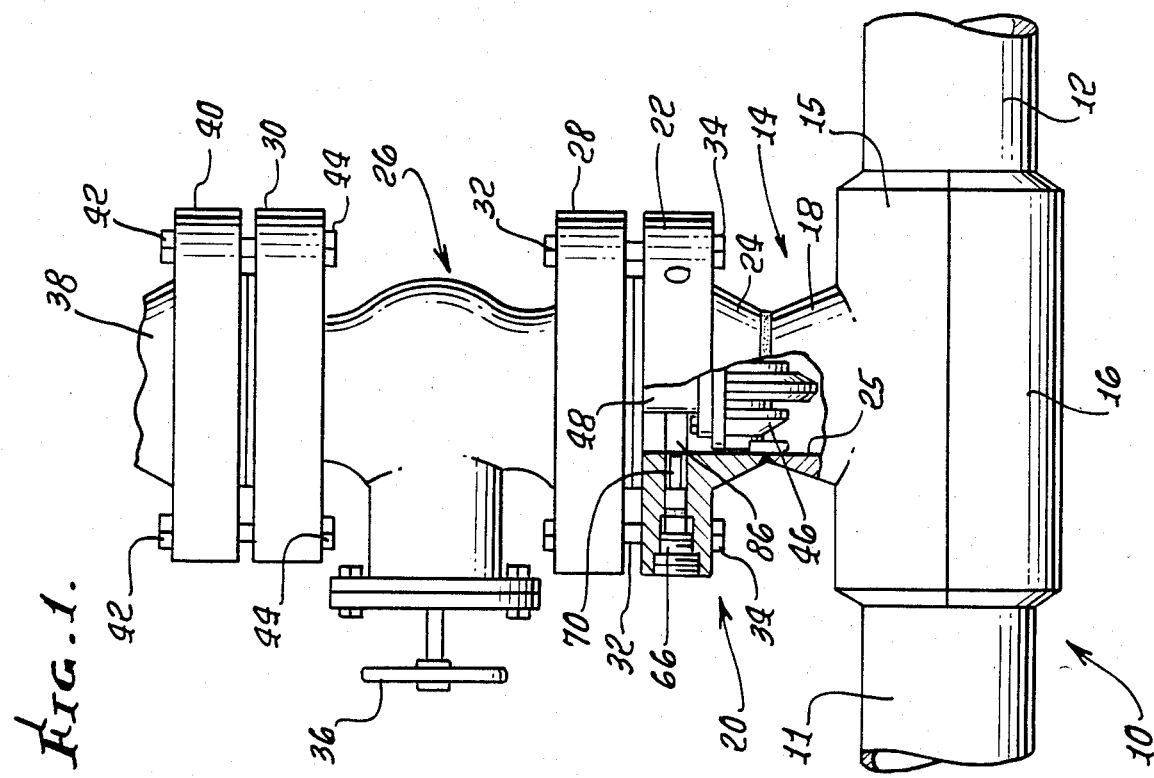

FLANGE SYSTEM FOR PIPELINE PLUGGING

BACKGROUND OF THE INVENTION

This invention is directed to a means for locking a pipeline plug in a pipeline flange.

When a section of a pipeline must be repaired or modified, a temporary bypass pipeline, with temporary valves, is usually installed to circumvent the section. T-fittings are mounted on the main pipeline, one on each side of the section in question, and the bypass pipeline is attached to flanges on the T-fittings. Each end of the section may then be plugged, and repairs may be made, the bypass pipeline allowing fuel flow to continue uninterrupted.

Once work on the section is complete, it is desirable to remove the bypass pipeline and temporary valves for use elsewhere, and then to plug the flanges. Cylindrically shaped plugs may be inserted into the flanges and locked in place, preventing loss of fluid from the pipeline through the flanges.

One means of locking a plug in place in a flange is to provide the plug with an annular groove which is engaged by a plug locking means that is carried within the flange. Such a locking means may comprise either arcuate locking collars or unthreaded pins which are carried within the flange on threaded pins, the threaded pins being used to insert the collars or unthreaded pins into—and retract then from—the annular groove, for locking and unlocking the plug, respectively.

One device using plug locking means carried on threaded pins is described in Ver Nooy U.S. Pat. No. 2,988,111. This device utilizes threaded pins with unthreaded portions at one end thereof, which engage an annular groove on the plug for locking the plug in place. A disadvantage of this device is that the unthreaded portion of each pin is relatively narrow in cross-section, leading to the exertion of high pressure by the plug on the pin due to the force of the fluid in the pipeline upon the plug, thus leading to a greater likelihood of damage to both the pin and the plug.

A device utilizing locking collars to lock a flange plug in place is disclosed in Ver Nooy U.S. Pat. No. 2,771,096. In that device, a threaded pin carrying an arcuate locking collar is mounted in a threaded inner cylindrical bore, the pin including a portion that extends into a outer cylindrical bore. The threaded pin is rotated for insertion and retraction of the collar into and out of the plug's annular groove. The inner cylindrical bore in Ver Nooy U.S. Pat. No. 2,771,096 must be coaxial with the outer cylindrical bore within very close tolerances, to prevent the pin from binding against one of the bores upon being rotated.

Another device using a locking collar concept is disclosed in Publication No. 00-3795-0079 and Bulletin 504.0 of T. D. Williamson, Inc. of Tulsa, Okla. This device, like Ver Nooy U.S. Pat. No. 2,771,096, relies upon the precise coaxialness of two adjacent cylindrical bores so as to prevent binding of the segment screw (the equivalent of the aforementioned threaded pin) against its associated cylindrical bore. The nut in Williamson carries the retainer ring segment (the equivalent in the Williamson device to the locking collar in Ver Nooy U.S. Pat. No. 2,771,096). Another problem with the Williamson device is that if a worker rotates the segment screw inwardly before the plug is in place, it is possible for the ring segment to fall, or be shaken loose by vibrations, from the segment nut and into the main pipeline, because the ring segment (i.e., locking collar) is not securely attached to the segment nut. In fact, a careless worker could accidentally allow the entire segment nut to be vibrated loose and fall in the same manner, merely by rotating the segment screw (threaded pin) too far and disengaging the screw from the nut. Such a happenstance would require installation of yet another pipeline plug upstream of the flange for repairing the plug locking device; and any parts that fell into the main pipeline would be swept away by the force of the fluid flow.

It is therefore an object of this invention to provide a system for locking a pipeline plug in a pipeline flange wherein locking means for locking the plug in place engages the plug in a relatively large cross-section for preventing damage to either the plug or locking means.

It is another object of this invention to provide a system for locking a pipeline plug in a pipeline flange utilizing a threaded means for locking and unlocking the plug that does not depend upon precise coaxialness of bores in the flange.

It is a further object of this invention to provide a system for locking a pipeline plug in a pipeline flange wherein deviations from manufacturing precision will not result in binding of the components of the system.

It is yet another object of this invention to provide a system for locking a pipeline plug in a pipeline flange wherein the components thereof are securely attached to one another, so that they cannot accidentally become separated during use.

It is a further object of this invention to provide a system for plugging a pipeline flange wherein the components thereof cannot become dislodged or fall into the pipeline, avoiding costly and time-consuming repairs.

Other objects, advantages, features and results will more fully appear in the course of the following description.

SUMMARY OF THE INVENTION

A system for locking a pipeline plug with a first annular groove in a pipeline flange, including at least one radial passage in the flange and a locking means for locking the plug in place in the flange. The radial passage includes a threaded driver bore and an unthreaded pin bore. Each such locking means includes a pin carried in the pin bore and mounted on a driver, the driver being threadedly mounted in the bore. The pin carries a means for engaging the plug such as an arcuate locking collar. When a driver is rotated in one direction, the pin that is carried thereby moves inwardly, and the collar carried by the pin is thereby inserted into the groove of the plug for locking the plug in place. The collar is retracted therefrom for unlocking the plug by rotation of the driver in the opposite direction.

The pin is connected to the driver in a secure yet slightly flexible fashion, such that inprecisions in manufacturing of the bores will not result in binding of either the driver or the pin, and such that rotation of the driver cannot cause disengagement of the pin or collar therefrom.

BRIEF DESCRIPTION OF THE DRAWINGS

FIG. 1 is an elevation, partly in section, of a flange system incorporating the presently preferred embodiment of the invention, mounted upon a T-fitting attached to a pipeline;

FIG. 2 is an elevation, partly in section, of the flange system of FIG. 1 with a pipeline plug locked therein;

FIG. 3 is a perspective view of the pipeline plug of FIG. 2;

DESCRIPTION OF THE PREFERRED EMBODIMENT

Figure 4:
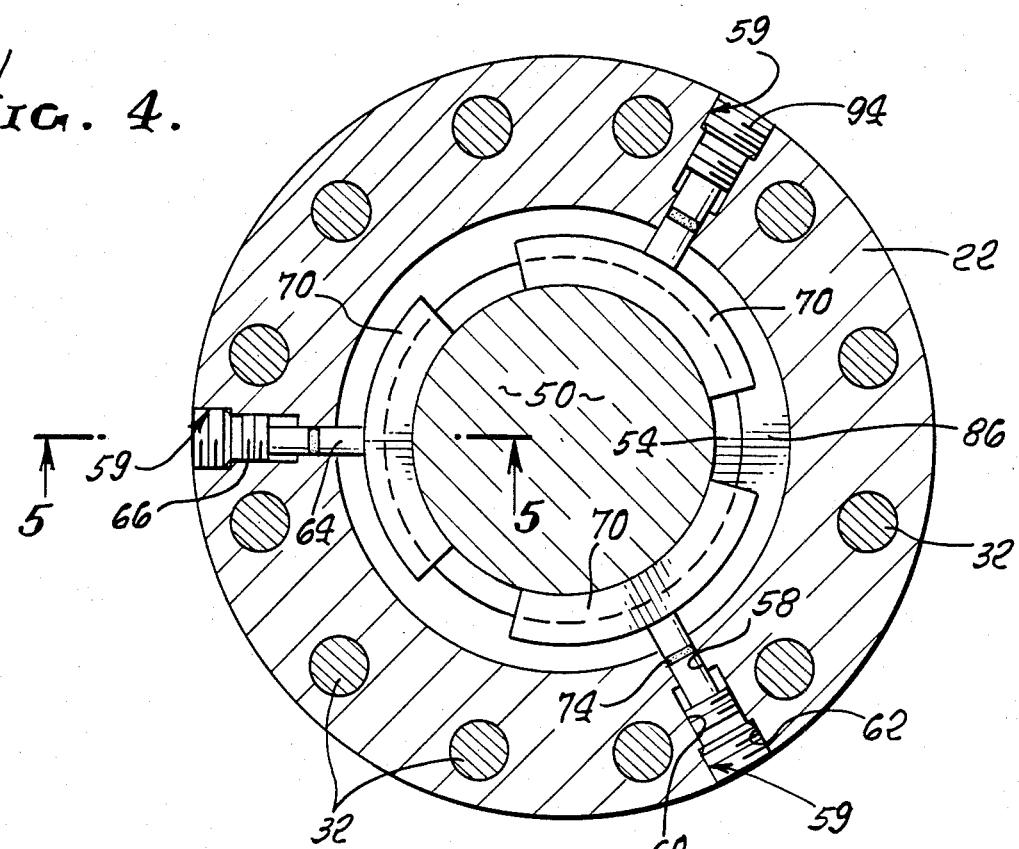
FIG. 4 is a cross-sectional view taken along the line 4—4 of FIG. 2.
Figure 6:
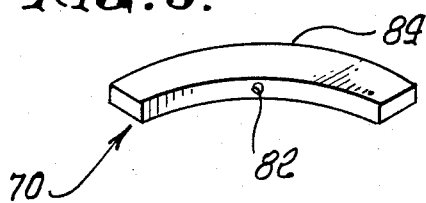
FIG. 6 is a perspective view of an arcuate collar of the presently preferred embodiment of the invention.

FIG. 1 shows a portion of a main pipeline 10 with an upstream section 11 and a downstream section 12. A pipeline connection such as T-fitting 14 with an upper section 15 and a lower section 16 is attached to the pipeline 10 in a manner conventional in the art. Upper section 12 includes a T-fitting protrusion 18.

Flange system 20 includes a flange 22, a first attachment means for attaching said flange to protrusion 18, such as flange protrusion 24, and an axial passage such as cylindrical passage 25 through said flange and protrusion for receiving pipeworking tools or a pipeline plug. Protrusion 24 is attached by means of a butt weld, or by other strong, fluid-tight means, to protrusion 18.

When repair or modification of the pipeline 10 is necessary, such as on a portion of the pipeline downstream of section 12, it is desirable to divert fluid flowing from the upstream section 11 through an auxiliary pipeline (not shown in the drawings) away from section 12. T-fitting 14 is attached to the pipeline 10, and then flange system 20 is attached to the T-fitting, as described above. Thereafter, a temporary valve 26 is attached to flange system 20. Valve 26 includes a lower flange 28 and an upper flange 30. Each of flanges 22, 28 and 30 may be provided with a second attachment means such as bolt holes (not shown in the drawings) for attaching pipe hardware such as valves, boring tools, plug-inserting tools, and blind flanges. Thus, valve 26 is attached to flange system 20 by securing flanges 22 and 28 to one another by means of bolts 32—which extend through said bolt holes—and nuts 34.

Valve 26 is then opened by rotating hand wheel 36, and a boring machine 38, partially shown in the drawings, is attached by means of boring machine flange 40, which may also includes bolt holes, to upper flange 30, by securing said flanges 30 and 40 to one another by means of bolts 42 and nuts 44, in the manner described above in connection with flanges 22 and 28.

Boring machine 38 includes a bit 46 carried by rod 48. The rod 48 is inserted through valve 26 and through passage 25 of flange system 20 until bit 46 contacts pipeline 10. But 46 is then rotated to drill a hole through the pipeline 10. Rod 48 is then raised until bit 46 does not protrude into valve 26, which is then closed by means of hand wheel 36. Boring machine 38 may then be removed, and one end of said auxiliary pipeline is attached to upper flange 30 of the valve 26.

The other end of said auxiliary pipeline is attached to another temporary valve and flange system which are attached to the pipeline 10 at a portion thereof downstream of the portion of the pipeline to be repaired, in the manner described above. Thereafter, both temporary valve 26 and the temporary valve attached at said downstream portion of the pipeline may be opened, establishing a fluid bypass means which diverts fluid from downstream section 12. The pipeline 10 may then be plugged immediately upstream and immediately downstream of the portion thereof under repair, in a conventional manner, and fluid will continue to flow uninterrupted through said auxiliary pipeline.

Once work on the pipeline is complete, it is unplugged, and the temporary valves are closed, so that fluid once again flows from upstream section 11 through downstream section 12. Said auxiliary pipeline is then removed for use elsewhere.

The foregoing description is well-known in the art.

It is common practice also to remove the temporary valves, such as valve 26, for use elsewhere, to minimize expenses for each pipeline repair. In order to remove valve 26, however, it is first necessary to insert a plugging means into flange system 20. Thus a plug-inserting machine (not shown in the drawings) is attached to flange 30, said machine carrying plugging means such as plug 50 by gripping bores 52 extending partially therethrough. Said plug-inserting machine includes means for preventing fluid flow past it or through it, and thus valve 26 may be opened without loss of fluid from pipeline 10, once the plug-inserting machine has been attached to said flange 30.

Plug 50 is approximately cylindrical, and has a diameter slightly less than the diameter of axial passage 25. Plug 50 typically includes a first annular groove such as groove 54 for receiving a locking means, and a first sealing means to prevent loss of fluid from the main pipeline 10, such as annular O-ring groove 56 and O-ring 57 seated therein.

Flange 22 includes at least one radial passage 59 extending radially therethrough, the radial passage 59 comprising a unthreaded pin bore 58 and a threaded driver bore 60 said bores being approximately coaxial with one another and constituting a communication means between the exterior of the flange system 20 and the passage 25. The radial passage may also include an access bore 62 adjacent to and approximately coaxial with the driver bore. In the preferred embodiment there are three such radial passages 59, as shown in FIG. 4.

Bores 58 and 60 carry a locking means for engaging annular groove 54 of plug 50, said locking means comprising a pin 64 carried in said pin bore and a driver 66 carried in said driver bore, a nut 68, and a locking collar 70. Driver 66 includes a means for being rotated, such as an Allen wrench receptacle 71. Pin 64 includes a second sealing means, such as O-ring groove 72 and O-ring 74, a driver boss 76 upon which driver 66 is loosely seated and which may be unthreaded, an outer threaded portion 78 and an inner threaded portion 80.

Figure 5:
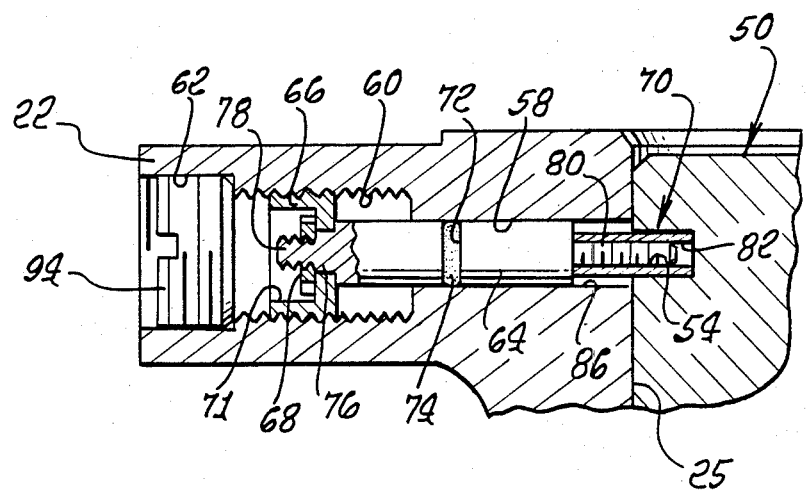
FIG. 5 is an enlarged sectional view of a portion of FIG. 2.
Figure 7:
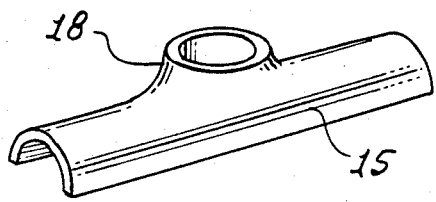
FIG. 7 is a perspective view of the top section of the T-fitting of FIG. 1.

Said locking means is assembled by first inserting O-ring 74 into O-ring groove 72, then threading inner threaded portion 80 of pin 64 into a threaded radial collar bore 82 provided in the arcuate locking collar 70, said portion 80 being threaded into bore 82 from a convex side 84 of the collar 70. Then pin 64 is inserted from within passage 25 into bore 58, so that outer threaded portion 78 protrudes into bore 60. Driver 66 is then seated on boss 76 within bore 60, and is then secured thereto by threading nut 68 onto threaded portion 78. Boss 76 has a diameter slightly smaller than the inside diameter of driver 66, such that the boss and driver may flex slightly with respect to one another to accomodate any imprecisions in the manufacturing of driver bore 60 and pin bore 58. At this point, locking collar 70 may be inserted into or retracted from axial passage 25 by rotating driver 66. Flange 22 includes an arcuate collar receptacle 86, shown in the sectional view of FIG. 5, for receiving collar 70, which may be retracted completely from passage 25 by rotation of driver 66.

After each such locking means has been assembled, collars 70 are retracted into receptacles 86, and said plug-inserting machine, carrying plug 50 by gripping bores 52, is attached to flange 30. Valve 26 is then opened by means of hand wheel 36, and plug 50 is inserted into flange 22. Collars 70 are then inserted into annular groove 54 by rotating drivers 66 using, for example, on Allen wrench inserted into wrench receptacles 71.

It will be noted that, because driver 66 seats flexibly on boss 76, bore 60 and bore 58 may be noncoaxial with respect to one another, within a relatively large margin of error without resultant binding either of the pin 64 in bore 58 or of the driver 66 in bore 60. It will also be noted that pin 64 may not accidentally become disengaged from driver 66, nor may collar 70 become disengaged from pin 64.

Once plug 50 has been locked into place by means of collars 70, said plug-inserting machine may be detached from flange 30. Temporary valve 26 may be detached from flange 22, and typically a blind flange such as flange 88 will be attached by means of bolts 90 and nuts 92 to the flange 22. Access bores 62 are then plugged by plugging means such as caps 94 both for preventing any leakage of fluid through channels 59 and to prevent unwanted substances such as water and dirt from invading bore 62 and causing corrosion.

Various modifications and alternative embodiments of the foregoing disclosure may be made without departing from the spirit and scope of this invention.

We claim:

1. In a flange system for locking a plug in a pipeline flange, said plug having a first annular groove, the combination of:
   a flange including an axial passage therethrough for receiving pipeworking tools or a pipeline plug, said flange having at least one radial passage for receiving locking means for locking a pipeline plug, each said radial passage including a threaded driver bore and a pin bore;
   at least one locking means for engaging said first annular groove for locking a pipeline plug in place, said locking means including a driver threadedly carried in said driver bore and a pin carried and freely slidable in said pin bore and flexibly attached to said driver, with the axial distance moved by said pin in said pin bore being substantially equal to the axial distance moved by said driver by rotation thereof within said driver bore; and
   first attachment means for attaching said flange to a pipeline connection.

2. The flange system of claim 1 wherein said driver bore is adjacent to and approximately coaxial with said pin bore.

3. The flange system of claim 1, wherein said locking means includes an arcuate locking collar carried by said pin for insertion into and retraction from said first annular groove.

4. The flange system of claim 3, wherein said pin includes an outer threaded portion, a driver boss adjacent to said outer threaded portion, a second sealing means for preventing loss of fluid past the pin, and an inner threaded portion.

5. The flange system of claim 4, wherein:
   said driver is seated on said driver boss in a flexible manner;
   said driver is attached to said pin by means of a nut threaded onto said outer threaded portion;
   said second sealing means comprises an annular O-ring groove and an O-ring seated therein;
   said locking collar includes a threaded radial collar bore; and
   said collar bore is threadedly attached to the inner threaded portion of said pin by means of said collar bore.

6. The flange system of claim 4, wherein the flange includes an arcuate collar receptacle for receiving said collar therein upon retraction from said axial passage.

7. The flange system of claim 1, wherein said axial passage is a generally cylindrical passage for receiving a generally cylindrical pipeline plug, said plug including a first sealing means for preventing loss of fluid past the plug.

8. The flange system of claim 7, wherein said first sealing means comprises a second annular groove and an O-ring seated therein.

9. The flange system of claim 1, wherein:
   each such radial passage includes an access bore adjacent to said driver bore; and
   said flange system includes a plugging means for insertion into said access bore for prevention of leakage of fluids and for protection of said locking means from corrosive substances.

* * * * *